US012756749B2

(12) United States Patent
Daniel et al.

(10) Patent No.: US 12,756,749 B2
(45) Date of Patent: Oct. 6, 2026

(54) METHOD AND APPARATUS FOR ENCODING AND MULTIPLEXING A STREAM IN A SERIAL CHANNEL

(71) Applicant: NXP USA, Inc., Austin, TX (US)

(72) Inventors: Steven Daniel, Gilbert, AZ (US); Arindam Dasgupta, Bangalore (IN); Krishnan Tiruchi Natarajan, Cuptertino, CA (US)

(73) Assignee: NXP USA, Inc., Eindhoven (NL)

( * ) Notice: Subject to any disclaimer, the term of this patent is extended or adjusted under 35 U.S.C. 154(b) by 164 days.

(21) Appl. No.: 18/658,400

(22) Filed: May 8, 2024

(65) Prior Publication Data

US 2025/0301030 A1 Sep. 25, 2025

(30) Foreign Application Priority Data

Mar. 19, 2024 (IN) ............................ 202441020351

(51) Int. Cl.
*H04L 65/70* (2022.01)
*G06F 13/16* (2006.01)
*G06F 13/38* (2006.01)

(52) U.S. Cl.
CPC ............ *H04L 65/70* (2022.05); *G06F 13/161* (2013.01); *G06F 13/38* (2013.01)

(58) Field of Classification Search
CPC ....................... H04L 65/70; G06F 13/42–4295
See application file for complete search history.

(56) References Cited

U.S. PATENT DOCUMENTS 10,594,337 B2 * 3/2020 Sudhakaran .......... H03M 5/145
11,824,563 B2 * 11/2023 Seol ........................ H03M 5/20
2004/0090962 A1 * 5/2004 Forest ..................... H04L 12/44 370/442
2005/0025195 A1 * 2/2005 Barrett .................. H04L 1/0061 370/532
2008/0095191 A1 * 4/2008 Knapp ...................... H04J 3/12 370/470
2010/0049880 A1 * 2/2010 Santhanam ......... G06F 13/4081 710/15
2010/0265109 A1 * 10/2010 Abbasfar ............ H04L 25/4908 341/76
2010/0290481 A1 * 11/2010 Abbasfar ............ H04L 25/4908 370/441
2010/0296523 A1 * 11/2010 Wego .................... H04J 3/1623 370/503

(Continued)

FOREIGN PATENT DOCUMENTS

WO 2022072052 A1 4/2022

OTHER PUBLICATIONS

Wikipedia, "DC bias," XP093287552, Retrieved from the Internet: URL:https://en.wikipedia.org/w/index.php?title=DC_bias&oldid=1187968676[retrieved on Jun. 17, 2025], Dec. 2, 2023 edited by Kvng, 3 pages.

*Primary Examiner* — Chris Parry
*Assistant Examiner* — Steven C Nguyen

(57) ABSTRACT

A state transition for a stream and a timing of when the state transition is detected with respect to a duration of a frame which is to be transmitted over the serial channel. The state transition and timing of the state transition is coded into a codeword which is inserted into a portion of a frame which is transmitted over the serial channel to transmit the stream over the serial channel.

22 Claims, 6 Drawing Sheets

(56) References Cited

U.S. PATENT DOCUMENTS

| | | | | |
|---|---|---|---|---|
| 2012/0119926 | A1* | 5/2012 | Markram | H04L 25/493 341/50 |
| 2012/0215952 | A1* | 8/2012 | Werner | H04N 21/242 710/33 |
| 2015/0030071 | A1* | 1/2015 | Heng | H04N 21/23439 375/240.16 |
| 2015/0301979 | A1 | 10/2015 | Mishra et al. | |
| 2015/0356053 | A1 | 12/2015 | Mishra et al. | |
| 2017/0118039 | A1* | 4/2017 | Wiley | H04L 12/40136 |
| 2019/0095273 | A1* | 3/2019 | Graif | G06F 13/40 |
| 2019/0129881 | A1 | 5/2019 | Wietfeldt et al. | |
| 2019/0171588 | A1 | 6/2019 | Mishra et al. | |

* cited by examiner

302

| STATE TRANSITION | TRANSITION TIME | ENCODING |
|---|---|---|
| STATE CHANGE TO 1 | 0-2ns | 1 |
| STATE CHANGE TO 2 | 0-2ns | 2 |
| STATE CHANGE TO 3 | 0-2ns | 3 |
| STATE CHANGE TO 4 | 0-2ns | 4 |
| STATE CHANGE TO 1 | 2-4ns | 5 |
| STATE CHANGE TO 2 | 2-4ns | 6 |
| STATE CHANGE TO 3 | 2-4ns | 7 |
| STATE CHANGE TO 4 | 2-4ns | 8 |
| ⋮ | ⋮ | ⋮ |
| STATE CHANGE TO 4 | 158-160 ns | 320 |

| STATE TRANSITION | TRANSITION TIME | ENCODING |
|---|---|---|
| STATE CHANGE TO 1 | 0-2ns | 1 |
| STATE CHANGE TO 2 | 0-2ns | 2 |
| STATE CHANGE TO 3 | 0-2ns | 3 |
| STATE CHANGE TO 4 | 0-2ns | 4 |
| STATE CHANGE TO 1 | 2-4ns | 5 |
| STATE CHANGE TO 2 | 2-4ns | 6 |
| STATE CHANGE TO 3 | 2-4ns | 7 |
| STATE CHANGE TO 4 | 2-4ns | 8 |
| | • • • | |
| STATE CHANGE TO 4 | 82-84ns | 164 |

METHOD AND APPARATUS FOR ENCODING AND MULTIPLEXING A STREAM IN A SERIAL CHANNEL

CROSS-REFERENCE TO RELATED APPLICATIONS

This application claims the priority under 35 U.S.C. § 119 of India patent application Ser. No. 202441020351, filed on 19 Mar. 2024, the contents of which are incorporated by reference herein.

FIELD OF USE

The present disclosure relates generally to serial communication, and more particularly, to a method and apparatus for encoding and multiplexing a stream in a serial channel.

BACKGROUND

A host and device which each might be a smartphone, laptop computer, or other electronic device generate respective streams including bursty streams, isochronous streams, and available bit rate streams. A universal serial bus (USB) stream is an example of a bursty stream, an audio stream is an example of an isochronous stream, and a fixed rate serial data stream is an example of an available bit rate stream. The streams generated by the host are typically transmitted to the device and the streams generated by the device are typically transmitted to the host over a parallel wired channel such as a universal serial bus (USB). The parallel wired channel allows for the streams to be transmitted between each other while still meeting latency and jitter requirements for the streams.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
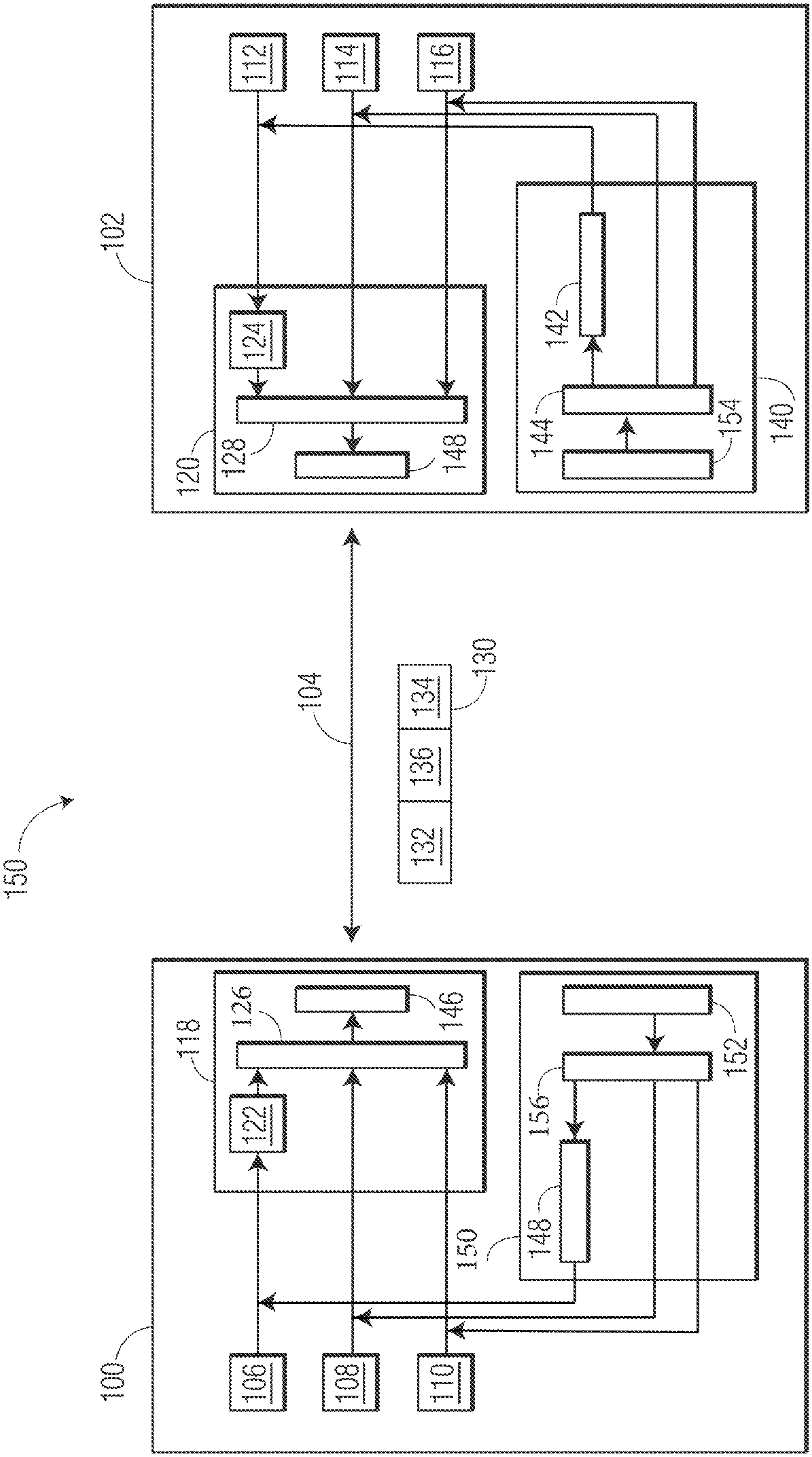
FIG. 1 is an example block diagram of a communication system including a host and a device which are coupled by a serial channel in accordance with an embodiment.

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to a method and apparatus for transmitting streams between a host and a device over a serial channel rather than over a parallel wired channel. The serial channel is serial wired channel or serial wireless channel and the serial channel which is the serial wireless channel avoids a need to physically connect the host and device together while still meeting latency and jitter requirements for the transmitted streams. In an example, content of streams is transmitted over a serial channel in a frame which includes a host downstream portion and a device upstream portion. The host transmits the host downstream portion to the device and includes a synchronization field for establishing timing for reception of the host downstream portion by the device, a header which identifies a format of the frame, and one or more subframes which carry content of respective stream transmitted by the host such as a bursty stream, isochronous stream, and an available bit rate stream. State transitions and corresponding timing of the state transitions define content of a stream. In some examples, the state transitions and timing are encoded as codewords. For example, universal serial bus (USB) streams define different bus states with a defined timing associated with transition of bus states. To maintain the timing, the bus state transitions and transition timing of the bus states with reference one or more of a start time, end time, or intermediate time of a frame are encoded as codewords that are carried in a subframe. In other examples, bits in a stream are transmitted. For example, bits of the isochronous streams or bits of the available bit rate streams which include digital audio or fixed rate serial data, respectively, are carried in respective subframes. In an example, the device receives the host downstream transmission portion over the serial channel. The device also transmits the upstream device portion of the frame after an idle period which include a propagation delay from the host to the device over the serial channel and a turnaround time for a transceiver of the device to change from transmission to reception. The upstream portion includes a synchronization field for establishing timing for reception of the upstream portion by the host and one or more subframes which carry content of a respective stream transmitted by the device which is received by the host over the serial channel. The encoding of state transitions of a stream into codewords which are decoded maintains a timing between states when the stream is transmitted over the serial channel to meet latency and jitter requirements for the transmitted streams. Well known instructions, protocols, structures, and techniques have not been shown in detail in order not to obfuscate the description.

FIG. 1 is an example block diagram of a communication system 150 including a host 100 and a device 102 which are coupled by a serial channel 104 in accordance with an embodiment. The host 100 and device 102 may each be one or more of a smartphone, laptop, or other electronic device. The host 100 or device 102 may generate a stream or receive the stream from another device or system in an example. The host 100 and device 102 may have stream input/output (IO) circuits which outputs one or more types of streams to a respective transmission circuit 118, 120 or receives as an input one or more types of streams from a respective reception circuit 150, 140. The host 100 and device 102 may have a respective stream IO circuit 106-110 and 112-116 respectively that input or output bursty data stream (by stream IO circuits 106, 112) where content on the stream is present in uneven or short spurts, input or output an isochronous stream (by stream IO circuits 108, 114) where content on the stream is present periodically, or input or output an available bit rate stream (by stream IO circuits

110, 116) where content on the stream is present at a fixed data rate. An example of the bursty data stream may be universal serial bus 2.0 (USB2) or embedded USB2 fast speed (FS), USB low speed (LS), USB high speed (HS). USB as referred to herein may generally refer to one of the disclosed versions of USB2 and any subsequent versions (e.g., USB 3.0). An example of the isochronous stream may be packetized content such as an audio stream, and an example of the available bit rate stream may be a fixed rate data stream which guarantees a particular bit rate service such as housekeeping data (e.g., program state, variables) associated with the host 100 or device 102. The streams may be transmitted from the host 100 to device 102 and vice versa via the serial channel 104 such as a wireless radio frequency channel that operates in an unlicensed band between 57 and 63 GHZ, for example, or a serial wired channel. The serial channel allows for transmission of the streams between the host and device without being limited to a physical connection while maintaining latency and jitter requirements for the transmitted streams.

The transmission circuit 118 facilitates transmission of streams from the host 100 to the device 102 while the transmission circuit 120 facilitates transmission of streams from the device 102 to the host 100. Each transmission circuit has a respective encoder 122, 124 and aggregator 126, 128. The content of a stream (e.g., data and/or control information) may be defined by states. For example, a bursty stream in the form of a USB stream may define one of four bus states over time, referred to as J, K, single ended zero (SE0), and signal ended one (SE1) and a predefined timing between state transitions of 83.33 nanoseconds (ns). The encoder 122, 124 receives a respective bursty stream and encodes state transitions and timing of transitions with a codeword such that the states and timing are able to be recovered at a destination indicative of the content of the stream. The codewords will uniquely identify the state and timing of the state transition. Bits of other streams such as the isochronous stream or available bit rate stream may not be encoded as codewords in an example. The aggregator 126, 128 receives the codeword and bits from other streams and aggregates the codeword with the bits. In an example, the aggregator 126, 128 may aggregate bits of the isochronous stream or available bit rate stream with the codeword of the bursty stream without any codeword encoding.

In an embodiment, the state transitions of only a bursty stream are encoded as codeword. In other embodiments, state transitions of other streams may be encoded as codewords in addition to that of the bursty stream. For example, the state transition of the isochronous stream or available bit rate stream is encoded as codewords in addition to the state transition of the bursty stream. In other example, state transitions of a bursty stream may not be encoded as codewords.

A transmitter 146 then transmits the aggregation to the device 102 in a frame 130 which is transmitted over the serial channel 104 via transmitter 146 to transmit the streams. Similarly, a transmitter 148 transmits the aggregation to the host 100 in the frame 130 which is transmitted over the serial channel 104 via transmitter 148 to transmit the streams.

The frame 130 may have a host downstream portion 132 and a device upstream portion 134 in example separated by an idle period 136. The aggregator 126 aggregates the codeword and bits corresponding to the streams into the host downstream portion 132 of the frame 130 which is transmitted by the transmitter 146 and the aggregator 128 aggregates the codeword and bits corresponding to the streams into the device upstream portion 134 of the frame 130 which is transmitted by the transmitter 148. The transmission circuit 118 may transmit the host downstream portion 132 over the serial channel 104 and the transmission circuit 120 may transmit the device upstream portion 134 over the serial channel 104 after the idle period 136 to define the frame 130 transmitted over the serial channel 104. The frame 130 having the host downstream portion 132 and device upstream portion 134 may be transmitted at a fixed rate or a variable rate. In an example, a frame 130 may have a duration of 160 ns and a frame 130 may be transmitted every 160 ns. In another example, a frame 130 may have a duration of 160 ns and a frame 130 may be transmitted at a time greater than 160 ns. Further, a frame 130 may be transmitted a plurality of times over the channel 104 with the idle period 136 (not shown) also separating respective frames.

The host 100 and device 102 further includes a respective reception circuit 150, 140, with respective decoding circuit 148, 142 and disaggregator 156, 144. After the host 100 transmits the host downstream portion 132 of the frame 130, the reception circuit 140 of the device 102 receives the host downstream portion 132 of the frame 130 from a receiver 154 after a propagation delay over the serial channel 104. A disaggregator 144 receives the host downstream portion 132 and separates the codeword and bits corresponding to one or more of the encoded bursty stream, isochronous stream, and available bit rate stream. The bits of the isochronous stream and available bit rate stream are output as respective streams. The decoding circuit 142 further decodes the codeword of the bursty stream to recover the state transitions of the bursty stream and timing of the state transitions of the bursty stream. States of the bursty stream are output. The streams output may have a propagation delay over the serial channel 104 and latency associated when the frame 130 is generated and transmitted. The host 100 may also receive from the device 102 via a receiver 152 the device upstream portion 134 of the frame 130. A disaggregator 156 separates the codeword and bits corresponding to one or more of the bursty stream, isochronous stream, and available bit rate stream in the frame 130. The decoder circuit 148 decodes the codeword corresponding to the bursty stream and outputs the states of the bursty stream. The disaggregator 156 also outputs the isochronous stream and available bit rate stream. In an example, the transmission based on the disclosed framing and coding results in a half-duplex communication between the host 100 and device 102 over the channel 104 while maintaining latency and jitter requirements for the transmitted streams.

Figure 2:
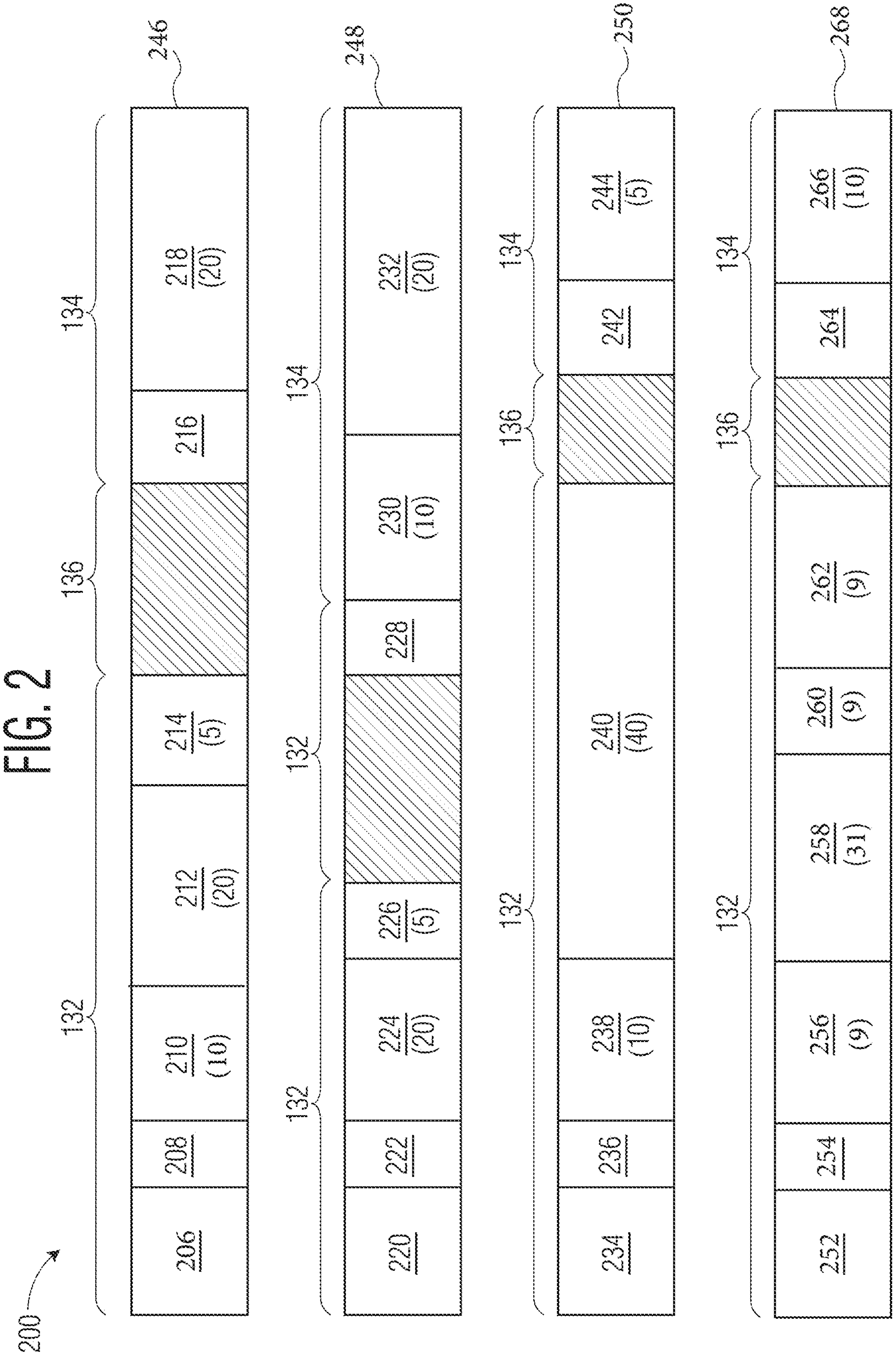
FIG. 2 illustrates various examples of frames transmitted over the serial channel in accordance with an embodiment.

FIG. 2 illustrates various examples frames 200 transmitted over the serial channel 104 in accordance with an embodiment. The frames 200 which include the host downstream portion 132, idle period 136, and device upstream portion 134 may include a plurality of subframes. A subframe may carry synchronization content, control information, and content of a stream in an example. Further, the frame may have a duration to maintain the latency and jitter requirements for the transmitted streams.

In one example, a frame 246 may have a host downstream portion 132 with subframes and a device upstream portion 134 with subframes which is separated by idle portion 136. The host downstream portion 132 may include a synchronization subframe 206, a header subframe 208, a bursty stream subframe 210 such as USB stream subframe, an isochronous stream subframe 212, and an available bit rate stream subframe 214. The device upstream portion 134 may include a synchronization subframe 216 and an isochronous subframe 218. Further, the host downstream portion 132 and the device upstream portion 134 may be separated by the idle period 136. In the idle period 136, the device 102 and host 100 are not transmitting. The USB stream subframe 210 which is 10 bits may include one or more codewords which encodes a bus state and a timing of transition of the bus state of the USB stream. Further, the isochronous stream subframe 212, 218 may define one or more audio bits shown as 20 bits of audio in an example and the available bit rate stream subframe 214 may define one or more available bit rate stream bits shown as 5 bits of housekeeping data in an example. In the example, 20 bits transmitted in the isochronous stream subframe 212, 218 may correspond to a 125 Mb/see bit rate. The synchronization subframe 208 may include a plurality of host clock transitions of a host clock which is used to synchronize a device clock of the device 102 for receipt of the host downstream portion 132. Similarly, the synchronization subframe 216 may include a plurality of device clock transitions of a device clock which is used to synchronize a host clock of the host 100 for receipt of the host upstream portion 134. The header subframe 208 may further define a format of the frame 246 which identifies which types of subframes (e.g., bursty or USB stream subframe, isochronous stream subframe, available bit rate stream subframe) are included in each portion and where they are located in the frame 246. The header subframe 208 may allow for the device 102 to receive, disaggregate, and/or decode contents of the subframes and determine which subframes to transmit in the device upstream portion 134. For example, the header subframe 208 may indicate the type of subframes to be transmitted by the host 100 in the host downstream portion 132 and the type of subframes to be transmitted by the device 102 in the device upstream portion 134. In some examples, the header subframe 208 may not be included in each frame and when included may indicate a frame format for a group of transmitted frames. The header subframe 208 may also indicate other signaling associated with stream communication.

In another example, a frame 248 may have the host downstream portion 132 with subframes and the device upstream portion 134 with subframes which is separated by the idle period 136. The host downstream portion 132 may include a synchronization subframe 220, a header subframe 222, an isochronous stream subframe 224, and an available bit rate stream subframe 226. The device upstream portion 134 may include a synchronization subframe 228, a bursty stream subframe 230, and an isochronous stream subframe 232.

In yet another example, a frame 250 may have the host downstream portion 132 with subframes and the device upstream portion 134 with subframes which is separated by an idle period. The host downstream portion 132 may include a synchronization subframe 234, a header subframe 236, bursty stream subframe 238, and an isochronous stream subframe 240. The isochronous stream subframe 240 is 40 bits in this example. The device upstream portion 134 may include a synchronization subframe 242 and an available bit rate stream subframe 244.

In another example, a frame 268 may have the host downstream portion 132 with subframes and the device upstream portion 134 with subframes which is separated by an idle period. The host downstream portion 132 may include a synchronization subframe 252, a header subframe 254, bursty stream subframe 256, an isochronous stream subframe or available bit rate stream subframe 258 (e.g., non-USB stream), another bursty stream subframe 260, and an isochronous stream subframe or available bit rate stream subframe 262. The isochronous stream subframe or available bit rate stream subframe 258 is 31 bits and the isochronous stream subframe or available bit rate stream subframe 262 is 9 bits in this example. The bursty stream subframe 256 may be 9 bits. The device upstream portion 134 may include a synchronization subframe 264 and an isochronous stream subframe or available bit rate stream subframe 266 which is 10 bits. In some examples, the bits of the subframe 262 may not be transmitted and the bits allocated the subframe 266 instead, but the downstream portion 132 will still include two codewords of the bursty stream.

The bursty stream may be USB FS, USB HS, or USB LS and the isochronous stream may have a data rate of 250 Mb/see when the isochronous stream subframe carries 40 bits and 125 Mb/see when the isochronous stream subframe carries 20 bits. For USB, bus transitions may be separated by 83.33 ns. The frame 246-250, 268 may have a duration of 160 ns resulting in a maximum of two state transitions that is encoded in each frame 130 for USB. Further, in some examples, the bits of the non-USB subframes may be further encoded with 5b6b encoding where 5 bits (5b) is encoded into 6 bits (6b) for DC balance and to define sufficient 0/1 bit transitions in the frame 130, 8b10b encoding, 10b12b encoding, or 12b14b encoding. In this case, a number of bits transmitted in the non-USB subframes that represent content of the stream may be less because additional bits used for encoding. The particular frames 246-250, 268 which are transmitted over the serial channel 104 may vary over time depending on whether a stream has content to transmit in the frame duration resulting in a varying data rate associated with the bursty stream and isochronous stream in the example.

Figure 3A:
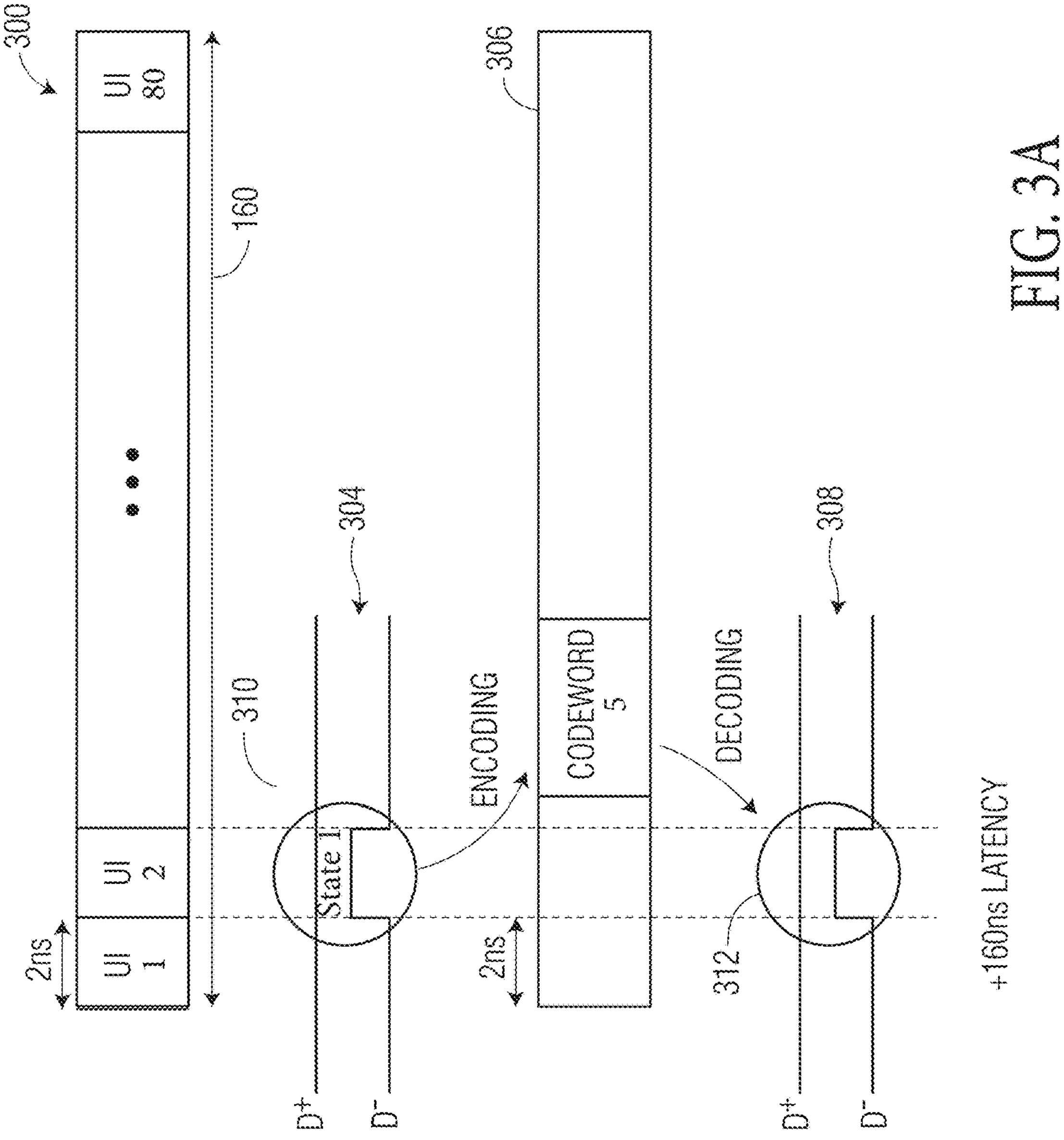
FIGS. 3A & 3B illustrate example coding of a stream in accordance with an embodiment.
Figure 3B:
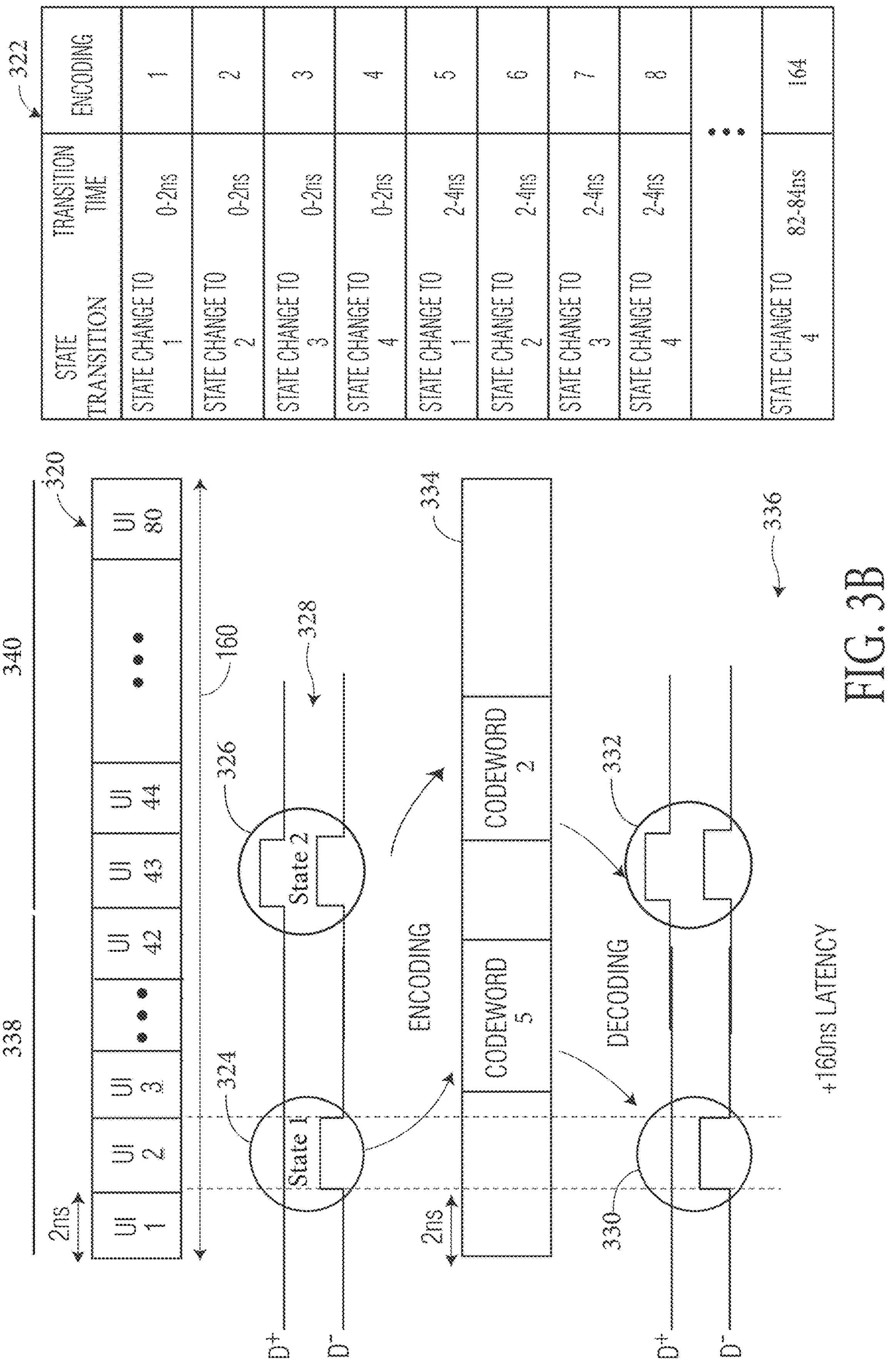

FIGS. 3A & 3B illustrate example coding of a stream in accordance with an embodiment. In an example, the coding may be performed by the host 100 and device 102 and in particular the encoder 122, 124. The stream may define states to transmit content of the stream. For example, if the stream is a bursty USB stream, the state may be a bus state and the USB stream may define four different bus states referred to as J, K, single ended 0 (SE0) and single ended 1 (SE1) associated with USB. A differential signal, e.g., D+ and D− of USB or eD+ and eD− of eUSB, which is each either a high or low signal on a USB bus may define each bus state and which in combination indicates one of the four bus states at a time.

The encoder may determine when the bursty stream has a state transition. The state transition may be when the a state of the stream transitions from one state to another, such as from J to K or SE0 to K as examples. This transition may be indicated in as little as a 83.33 ns interval or multiple of the 83.33 ns interval for the bursty stream in the form of the USB stream. The state to which the bursty stream transitions and the time of the transition may be coded with respect to a start time and duration of a frame which will be transmitted. In an example, a frame 300 may be 160 nanoseconds (ns) and be divided into 80 unit intervals (UI) resolution where each UI is 2 ns. The frame 300 may have 80 UI. The 2 ns may be a period of time that meets a transition jitter requirement (e.g., +/−3 ns or +/4 ns) for a USB FS stream. The bursty stream may indicate a state transition from one state to another state. This transition from one of four states may occur at a particular UI within the duration of the frame with a resolution of 2 ns in the example. Further, there may be up to 2 possible transitions within the 160 ns frame. The one or two state transitions may be encoded as a codeword and a frame with the codeword is transmitted to maintain the transition jitter requirement. A host 100 (device 102) may transmit the portion of frame 300. A device 102 (host 100)

which receives the portion of the frame 300 will decode the codeword and determine a timing of the state transition within the duration of the frame that is received and corresponding UI to generate a decoded stream with the state transition at the indicated time. Since the host 100 or device 102 may wait for 80 UI to encode a state transition before transmitting the portion of a frame 300, the decoded stream may have a latency of 160 ns. Further, the decoded stream will meet a USB jitter requirement because the transition is encoded within a UI of 2 ns.

The host 100 and device 102 may access a table 302 which defines a respective codeword for a transition to a state and the timing of the transition. For a bursty stream which is a USB stream, the table 300 may indicate codewords for a timing of a state transition in the stream to one of four state transitions with a resolution of the UI of the frame 300. For example, a codeword of 1 may be used to represent a transition/change to state 1 within 0-2 ns of the start of the frame or UI=1. As another example, a codeword of 5 may be used to represent a transition/change to state 1 within 2-4 ns of the start of the frame or UI=2 etc. A total of 320 codewords may be used to represent the possible state transitions and timing of the state transitions within the 160 ns frame with 2 ns resolution in this example. The codeword may be a 9 bit sequence. Further, in some examples, an additional bit may indicate a validity of the codeword. This bit may indicates that the bus state is valid. For example, if the bus is powered off then the D+/D−='00' state would not be a valid state of the stream. The codeword and validity bit may be included in the bursty stream subframe 210, 230, 238 as a 10 bit value in an example. The codeword may be different lengths and define additional state transitions or timing of state transitions in other examples for other types of streams with different numbers of states.

Consider the example in FIG. 3A which illustrates the coding and decoding of a USB stream having one state transition in a frame duration. A stream 304 may have a state transition 310 at UI=2 within a 160 UI duration of the frame 300 indicated by the D+/D− of a USB bus. The codeword associated with a state transition 310 to state 1 at UI-2 may be coded as codeword 5 and transmitted in a frame 306. A receiver of the frame such as the host 100 or device 102 may receive the frame 306 and a decoder 142, 148 may decode the codeword 5 to determine that a state change to state 1 occurred in UI=2 based on the table 302. The receiver may output an indication of the state change on the USB bus as D+/D− transitions 312 at UI=2 within a 160 ns frame duration to output the state of the received stream 308. The stream 308 may have a latency of at least 160 ns compared to the stream 304 but preserves a state transition timing in the received stream and meets transition jitter requirements because the state transition is coded and decoded within a 2 ns UI interval. Further, if a host 100 sends a request in one frame and the device 102 sends an acknowledgement in another frame, a round trip delay of 320 may be introduced between the transmission and receipt of the request and acknowledgement.

In an example, a USB stream may have a specific state at 83.33 ns intervals. The frame which is 160 ns may result in zero, one, or two state transitions encoded in a 160 ns frame. For example, if no transition in state occurs during a frame duration, then no codeword for the USB stream will be encoded in the frame and the received USB stream will not have a state transition for the frame duration. As another example, if a transition occurs at UI=40 the next state transition in 83.33 ns will be in another frame. But if a state transition occurs at UI=20, the state transition could occur at approximately UI=60 which is in the same frame and the frame may indicate two state transitions. Two codewords will be included in the frame. The header of the frame 300 may indicate a format of subframes, e.g., whether the frame does not include any codewords in a downstream or upstream portion or includes one or two codewords of the stream.

Consider the example in FIG. 3B which illustrates the coding and decoding of a USB stream having two state transitions in a frame duration. A frame 320 may be subdivided into a first duration 338 of 1-42 UI and a second duration 340 of 43-80 UI. A state transition may be coded as a position within the first duration 338 of a 42 UI interval or 83.33 ns time interval rather than being coded in an 80 UI or 160 ns interval since states of the USB stream are separated by 83.33 ns. For example, a stream 328 may have a state transition 324 at UI=2 to state 1 within the first duration of the 42 UI. The codeword associated with the state transition 324 at UI=2 may be coded as codeword 5 and transmitted in a frame 334 based on table 322. Additionally, the stream 328 may have a state transition 326 to state 2 at UI=43 in the second duration 340. The codeword associated with a state transition 326 at UI-43 may be coded as codeword 2 based on table 322 within the second duration 340 and transmitted in the frame 334. A receiver of the frame such as the host 100 or device 102 may receive the frame 334 and a decoder 144, 148 may decode the codeword 5 and 2 to determine that a state change to state 1 occurred in UI=2 based on the table 322 and a state change to state 2 occurred in UI=43 based on the table 322. The receiver may output an indication of the state change on the USB bus as D+/D- transitions 330, 332 at UI=2, UI-43 within a 160 ns frame duration to output the states of the received stream 336. A total of 164 codewords may be used to represent possible state transition and timing of the state transition within the first duration 338 (42 UI interval) and second duration 340 (38 UI interval) of the frame 320. Note codewords associated with UI=39 to UI=42 of the table 322 are not used in the 38 UI interval of the second duration 340 in this example. An 8 bit sequence may be used to represent a codeword and in some examples a validity bit may be added to the bit sequence to define a 9 bit codeword transmitted in a frame such as shown in subframe 256, 260 of frame 268. The codeword may be different lengths and define additional state transitions or timing of state transitions in other examples for other types of streams with different numbers of states.

The stream 336 may have a latency of at least 160 ns compared to the stream 328 and meet transition jitter requirements because the state transition is coded and decoded within a 2 ns UI interval. Further in other examples, the state transition and timing may be encoded as a codeword using a resolution of 160 ns based on table 302 rather than a resolution of 83.33 ns and transmitted in the frame 334.

The codewords which do not represent state transitions and timing in the table 322. 302 may be used for control or out of band signaling. For example, if the codeword is 9 bits, codewords indicated as 321-512 not shown in table 302 may represent control information of the stream. In an example, a control codeword such as codeword 400 may signal one or more of a frame structure of a USB stream such as 1 ms frames or 125 us microframes, an initial USB frame is to be transmitted, a synchronization of a clock is to be performed in the USB stream which is included in the frame 334 as in the USB subframe or in the header, chirps to transition from FS to HS, a valid bus state, or signaling between a device and host such as the device sending eD+ and the host responding with eD−. Further, bits of the codeword (and in some examples bits of the isochronous and available bit rate streams) may be further encoded to have a DC balance and sufficient transitions such as 10b12b encoding where every 10 bits is coded with 12 bits to achieve a DC balance and a number of transitions that meet predefined requirements.

In examples, a transition of a state of a bursty stream in the form of the USB FS stream, and timing of the transition is described as being coded by the example table 302, 322 in an example 160 ns or 83.33 ns resolution. States of other types of streams including isochronous streams or available bit rate streams (non-USB streams) may also or instead be coded in accordance with embodiments.

The states may be coded in other ways as well. For example, a codeword may have 2 bits which indicate a total number of state transitions within the 80 UI duration of a frame 300 (e.g., 0, 1, or 2 transitions), a position of each transitions within the 80 UI duration, each position coded as 7 bits (e.g., 14 bits total), and a bus state of each transition, where each bus state also coded as 2 bits (e.g., 4 bits total). The codeword may be transmitted in a frame 300 in an example. In other examples, a position of a transition within the 80 UI duration coded as 7 bits and the bus state of the transition coded as 2 bits may be used to code special states of the bus such as "no connect" in a frame 300 which carries only one codeword.

Figure 4:
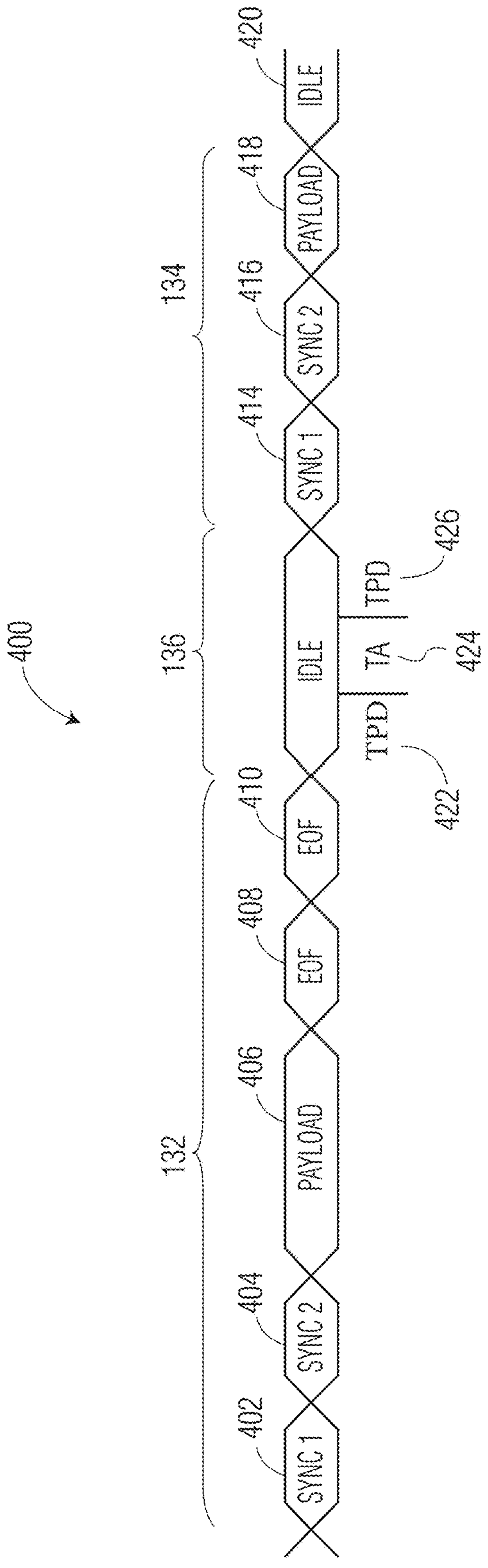
FIG. 4 illustrates an example frame in more detail in accordance with an embodiment.

FIG. 4 illustrates an example frame 400 in more detail in accordance with an embodiment. The host 100 may initiate transmission of the frame 400 in the example. The downstream portion 132 of the frame 400 which is transmitted includes one or more synchronization fields 402-404. A synchronization field 402, 404 may each have a duration such as 2 ns and include a plurality of clock transitions to synchronize a device clock of the device 102 before receiving the downstream portion 132. A payload 406 may follow the synchronization field 402-404 to indicate a format of the frame 400 in a header such as which subframes are included in the downstream portion 132 and upstream portion 134. The payload 406 may include one or more of the codewords or bits corresponding to a stream depending on format of the frame 400 followed by an end of frame (EOF) 408, 410 signaling. The upstream portion 134 of the frame 400 may also include one or more synchronization fields 414, 416 and a payload field 418. In an example, the payload field 418 may not include any header and include one or more of codewords or bits corresponding to a stream. The frame 400 may also include an idle period 136 between the downstream portion 132 and the upstream portion 134 and between frames. In an example, the idle period 136 between a host downstream portion 132 and host upstream portion 134 may define a transmit propagation delay (TPD) 422 of 2 UI for the host downstream portion 132 to reach the device 102 from the host 100 over the serial channel 104. Further, the idle period 136 may include a turnaround time (TA) 424 of 2 UI for a transceiver in the device 102 to transition from a receive mode to receive the host downstream portion 132 to a transmit mode to transmit the device upstream portion 102. Still further, the idle period 136 may include a TPD 426 for the device upstream portion 134 to reach the host 100 from the device 102 over the serial channel 104. In an example, a transmit propagation delay may be 5.5 ns from host 100 to device 102 and vice versa and the turnaround time may be 4.5 ns. An idle period 420 at an end of the device upstream portion 134 may also define the TPD/TA/TPD for a transceiver of the host 100 to receive a next frame and transition from receive mode to transmit mode.

Figure 5:
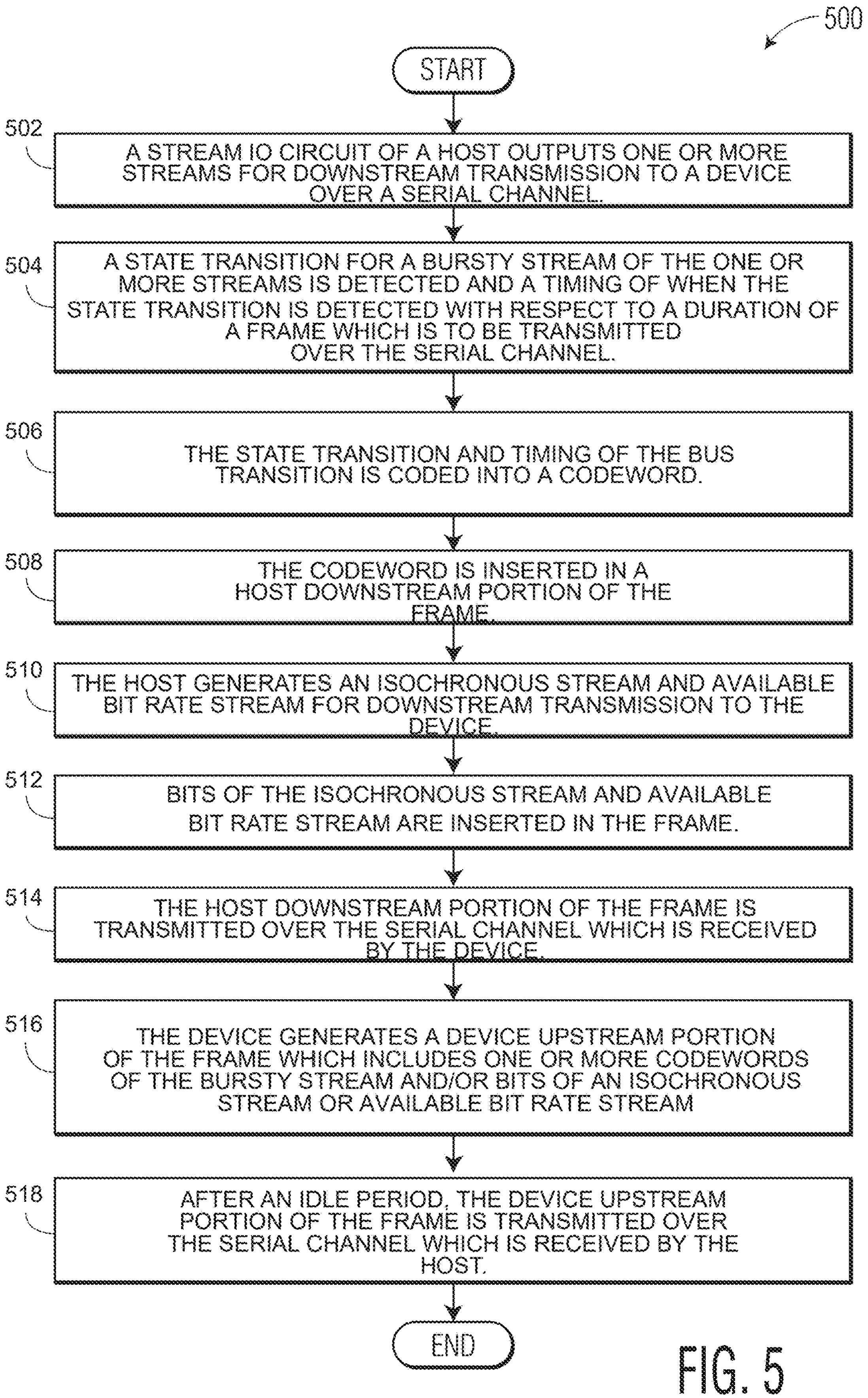
FIG. 5 is an example method for transmitting streams between a host and a device in accordance with an embodiment.

FIG. 5 is an example method 500 for wirelessly transmitting streams between a host and a device in accordance with an embodiment. Functions may be performed by the host 100 and device 102 in an example.

At 502, a stream IO circuit of a host provides one or more streams for downstream transmission to a device over a serial channel. A stream may be a bursty stream such as a USB stream in an example defined by a plurality of states, an isochronous stream, or an available bit rate stream. At 504, a state transition for a bursty stream is detected and a timing of when the state transition is detected with respect to a duration of a frame which is to be transmitted over the serial channel. The state transition may be a transition to a different state indicated by the stream and the time when the state transition occurs within the duration of the frame. At 506, the state transition and timing of the bus transition is coded into a codeword. The codeword may be a 8 or 9 bit codeword in an example for a USB stream. At 508, the codeword is inserted in a host downstream portion of the frame. At 510, the host generates an isochronous stream and available bit rate stream for downstream transmission to the device. At 512, bits of the isochronous stream and available bit rate stream are inserted in the frame. At 514, the host downstream portion of the frame is transmitted over the serial channel which is received by the device. In an example, the device may decode the codeword which defines the state transition and timing of the transition of state with respect to the duration of the frame that is received to recover the bursty stream at the device 102 and preserve a timing of the state transitions in the bursty stream transmitted by the host 100. The device may also output a transmitted isochronous stream and available bit rate stream. A device generates a stream for upstream transmission to a device. The stream may be one or more of a bursty stream, isochronous stream, or available bit rate stream in an example. At 516, the device generates a device upstream portion of the frame which includes one or more codewords of the bursty stream and/or bits of an isochronous stream or available bit rate stream. At 518, after an idle period, the device upstream portion of the frame is transmitted over the serial channel which is received by the host. In an example, the host may decode the codeword which defines the state and timing of the transition of state with respect to the duration of the frame that is received to recover the bursty stream at the host and preserve a timing of the state transitions in the bursty stream transmitted by the device. The host may also recover the transmitted isochronous stream and available bit rate stream from the device upstream portion. The encoding of states of the bursty stream into codewords which are decoded maintains a timing between states when the stream is transmitted over the serial channel to meet latency, jitter, and delay requirements for the transmitted streams.

In an example, transmitting a frame 130 over the serial channel 104 as described herein refers to the host 100 transmitting the host downstream portion 132 and the device 102 transmitting the device upstream portion 136 within a frame duration to define the frame that is transmitted over the serial channel 104 between the host 100 and device 102.

In an example, the codeword disclosed herein encodes a state change or state transition of a stream and a timing of the state change or transition in the frame. In other examples, the codeword may encode the state of the stream itself rather than a state change or state transition and timing of the state in the frame in accordance with embodiments.

In an embodiment, a method is disclosed. The method includes: receiving stream for transmission over a serial channel; determining a state transition in the stream and a timing of when the state transition occurs with respect to a duration of a frame which is to be transmitted over the serial channel; coding the state transition and timing of the state transition into a codeword; inserting the codeword into a portion of the frame; and transmitting the portion of the frame over the serial channel. In an example, the stream is a universal serial bus 2.0 (USB2) stream which defines one of four bus states encoded in the codeword. In an example, the stream has a first state of the four states at a first time, and wherein determining the state transition for the stream includes detecting that the first state transitions to a second state of the four states at a second time with respect to the duration of the frame. In an example, coding the state transition includes determining which codeword of a plurality of codewords defines the state transition and the second time when the state transition occurs. In an example, the codeword is 9 bits and the second time is indicated by a 2 ns unit interval resolution within a 160 ns duration frame when the state transition is detected. In an example, the frame includes no more than two codewords. In an example, the portion is first portion and the codeword is a first codeword, the method further including: receiving a stream for upstream transmission to a host over the serial channel, wherein the stream is a bursty stream; determining a state transition of the stream for upstream transmission and a timing of when the state transition is detected with respect to the duration of the frame which is to be transmitted over the serial channel; coding the state transition and timing of the state transition into a second codeword; inserting the second codeword into a second portion of the frame; and transmitting the second portion of the frame upstream to the host over the serial channel after an idle period that separates the first portion and the second portion. In an example, the idle period includes a turnaround time of a transceiver in the device and a propagation time over the serial channel. In an example, the method further includes inserting bits of an isochronous stream into the portion of the frame without any encoding. In an example, the isochronous stream is an audio stream. In an example, the method further includes inserting bits of an available bit rate stream into the portion of frame which is transmitted to the device. In an example, the available bit rate stream includes housekeeping data. In an example, the method further includes inserting a synchronization field and header in the frame, wherein the header identifies a format of the frame and types of subframes transmitted in the frame. In an example, the method further includes coding the codeword to achieve a DC balance and a predefined number of bit transitions in the frame.

In another embodiment, a device is disclosed. The device includes a stream circuit arranged to receive a stream for transmission over a serial channel; an encoder arranged to determine a state transition for the stream and a timing of when the state transition occurs with respect to a duration of a frame which is to be transmitted over the serial channel; and code the state transition and timing of the state transition into a codeword; an aggregator arranged to insert the codeword into a portion of the frame; and a transmitter arranged to transmit the portion of the frame over the serial channel. In an example, the stream is a universal serial bus 2.0 (USB) stream which defines one of four states. In an example, the stream has a first state of the four states at a first time, and wherein determining the state transition for the stream includes detecting that the first state transitions to a second state of the four states at a second time with respect to the duration of the frame. In an example, coding the state transition includes determining which codeword of a plurality of codewords defines the state transition and the second time when the state transition occurs. In an example, the codeword is a 9 bit codeword and the time is indicated by a 2 ns unit interval within a 160 ns duration frame when the state transition is detected. In an example, the aggregator is further arranged to insert bits of an isochronous stream or available bit rate stream into the portion of the frame without being encoded as a codeword.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more content processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

What is claimed is:

1. A method comprising:

receiving a stream for transmission over a serial channel;

determining a bus state transition in the stream and a corresponding unit interval (UI) of a plurality of unit intervals when the bus state transition occurs in the stream, wherein the plurality of unit intervals defines a fixed duration of a frame which is to be transmitted over the serial channel and the bus state transition indicates that a bus state of the stream transitions from one state to another state in the stream;

coding an indication of the bus state transition and the unit interval when the bus state transition occurs into a codeword;

inserting the codeword into a portion of the frame; and transmitting the portion of the frame over the serial channel, wherein the stream is upstream or downstream, the frame is defined by a downstream portion, and after an idle interval, the frame is defined by an upstream portion, and the codeword is inserted into the corresponding upstream portion or downstream portion of the frame.

2. The method of claim 1, wherein the stream is a universal serial bus 2.0 (USB2) stream which defines one of four bus states encoded in the codeword.

3. The method of claim 2, wherein the stream has a first state of the four states at a first time, and wherein determining the state transition for the stream comprises detecting that the first state transitions to a second state of the four states at a second time with respect to the duration of the frame.

4. The method of claim 3, wherein coding the state transition comprises determining which codeword of a plurality of codewords defines the state transition and the unit interval when the state transition occurs.

5. The method of claim 4, wherein the codeword is 9 bits and the unit interval is indicated by a 2 ns unit interval resolution within a 160 ns duration frame when the state transition is detected.

6. The method of claim 5, wherein the frame comprises no more than two codewords.

7. The method of claim 1, wherein the portion is first portion and the codeword is a first codeword, the method further comprising:

receiving the stream for upstream transmission to a host over the serial channel, wherein the stream is a bursty stream;

determining a second state transition of the stream for upstream transmission and a second unit interval (UI) of the plurality of unit intervals when the second state transition occurs within the duration of the frame which is transmitted over the serial channel;

coding an indication of the second state transition and the second unit interval when the state transition occurs into a second codeword;

inserting the second codeword into the upstream portion of the frame; and transmitting the second portion of the frame upstream to the host over the serial channel after the idle period that separates the first portion and the second portion.

8. The method of claim 7, wherein the idle period comprises a turnaround time of a transceiver in the device and a propagation time over the serial channel.

9. The method of claim 1, further comprising inserting bits of an isochronous stream into the portion of the frame without any encoding.

10. The method of claim 9, wherein the isochronous stream is an audio stream.

11. The method of claim 1, further comprising inserting bits of an available bit rate stream into the portion of the frame which is transmitted to the device.

12. The method of claim 11, wherein the available bit rate stream comprises housekeeping data.

13. The method of claim 1, further comprising inserting a synchronization field and header in the frame, wherein the header identifies a format of the frame and types of subframes transmitted in the frame.

14. The method of claim 1, further comprising coding the codeword to achieve a direct current (DC) balance and a predefined number of bit transitions in the frame.

15. The method of claim 1, wherein if no transition in state occurs during the frame duration, then no codeword is inserted into the frame.

16. A device comprising:

a stream circuit arranged to receive a stream for transmission over a serial channel;

an encoder arranged to determine a bus state transition for the stream and a corresponding unit interval (UI) of a plurality of unit intervals when the bus state transition occurs in the stream, wherein the plurality of unit intervals defines a fixed duration of a frame which is to be transmitted over the serial channel and the bus state transition indicates that a bus state of the stream transitions from one state to another state in the stream; and code an indication of the bus state transition and the unit interval when the bus state transition occurs into a codeword;

an aggregator arranged to insert the codeword into a portion of the frame; and a transmitter arranged to transmit the portion of the frame over the serial channel, wherein the stream is upstream or downstream, the frame is defined by a downstream portion, and after an idle portion, the frame is defined by an upstream portion, and the codeword is inserted into the corresponding upstream portion or downstream portion of the frame.

17. The device of claim 16, wherein the stream is a universal serial bus 2.0 (USB) stream which defines one of four states.

18. The device of claim 17, wherein the stream has a first state of the four states at a first time, and wherein determining the state transition for the stream comprises detecting that the first state transitions to a second state of the four states at a second time with respect to the duration of the frame.

19. The device of claim 18, wherein coding the state transition comprises determining which codeword of a plurality of codewords defines the state transition and the unit interval when the state transition occurs.

20. The device of claim 19, wherein the codeword is a 9 bit codeword and the second time is indicated by a 2 ns unit interval within a 160 ns duration frame when the state transition is detected.

21. The device of claim 16, wherein the aggregator is further arranged to insert bits of an isochronous stream or available bit rate stream into the portion of the frame without being encoded as a codeword.

22. The device of claim 16, wherein if no transition in state occurs during the frame duration, then no codeword is inserted into the frame.

* * * * *